Sept. 9, 1930.  G. FLINTERMANN  1,775,517
FLEXIBLE JOINT
Filed Feb. 17, 1927
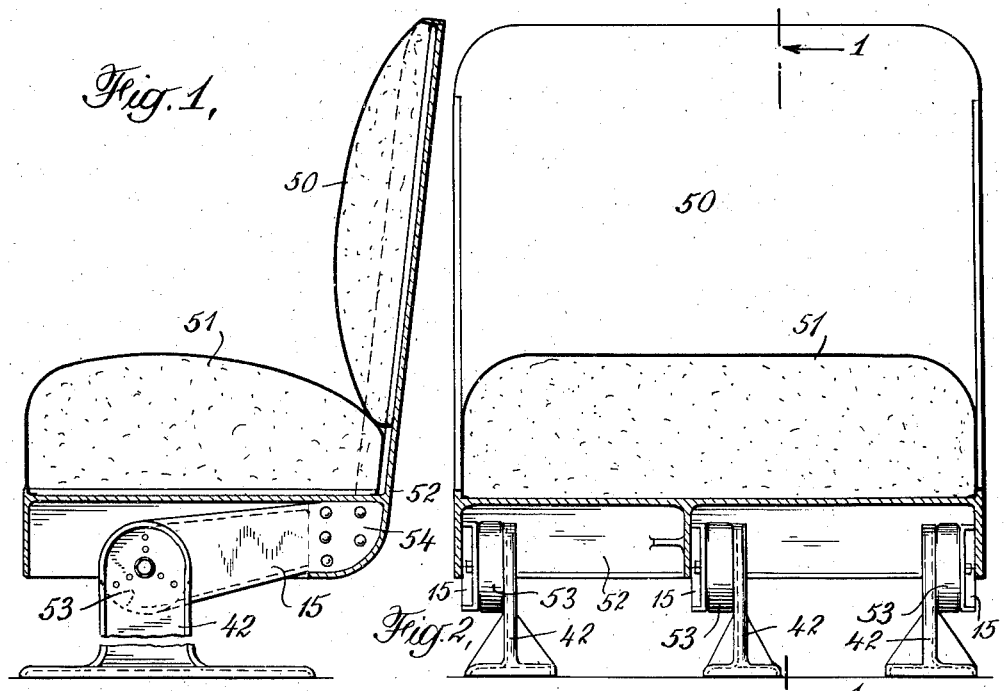
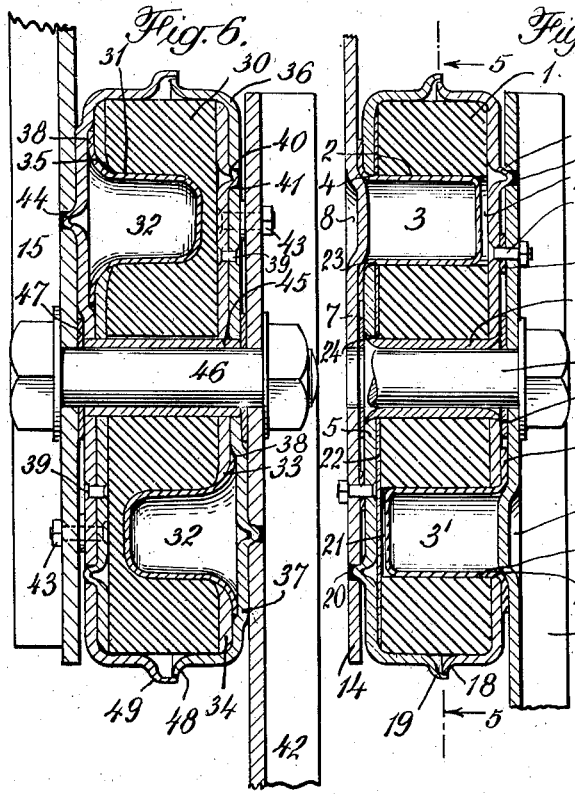
INVENTOR
Gerhard Flintermann
BY
Pennie, Davis, Marvin & Edmonds
ATTORNEYS Patented Sept. 9, 1930

1,775,517

UNITED STATES PATENT OFFICE

GERHARD FLINTERMANN, OF ORANGE, NEW JERSEY

FLEXIBLE JOINT

Application filed February 17, 1927. Serial No. 168,919.

The cost of drawing a large number of projections on a plate of metal is so expensive as to preclude the use of such plates in devices which must sell at a cost low enough to permit their wide use, or to prevent entirely the manufacture of inexpensive devices where no substitute for such plates has been devised. This invention comprises an inexpensive substitute for such a plate which is made by forming projecting members separately, as by a punching operation, and then assembling them with a plate which may be of metal or other material best suited to the particular circumstances involved. Such a plate with projections thereon may replace a metal plate with drawn projections in many constructions where it is desired to keep the cost low.

Moreover, this invention relates to improvements in flexible joints which are inexpensive to manufacture, and which may be used in various relations where a flexible connection or shock absorber is desired between two members, such, for instance, as in overhead holding straps in a subway train, in supporting a light vibrating machine, such as in an electric fan support, in yielding or flexing supports for seats of railway cars, automobiles and the like, and everyday furniture such as wooden chairs, typewriter stands, and various other relations suggested by what is hereinafter set forth.

Further, this invention relates to a flexible joint as applied to the support of the seat of an automobile bus or similar vehicle, and the invention embraces a suitable means of applying a flexible joint to support such a seat. More particularly, this invention relates to the adaptation of a particular type of flexible joint to the support of such a seat.

The improved flexible joint is of that general type in which relative motion between two parts is yieldingly resisted by an intervening body of resilient or flexible material such as rubber, leather or the like. The design of the flexible joint is such that it is particularly adapted for use in supporting a seat such as a seat in an automobile bus or railway car, and is especially adapted for use where economy of space is desired. Although adapted for use in all seats of an automobile bus or railway car, this flexible joint is especially adapted for use as a shock absorber on those seats in a bus which are directly over the wheel housings, for instance, where the space available for supporting the seat is at a minimum. It is also possible by the device of this invention to place the seats of a bus or the like near the floor and yet allow for plenty of foot room. These and other desirable advantages, which may be obtained by using the device of this invention in supporting seats, will be apparent from what follows.

This invention relates to various improvements over the flexible joint shown in my co-pending application No. 89,251, filed February 18, 1926.

The accompanying drawings illustrate modifications of various structures covered by this invention, and the adaptation of a flexible joint to the support of a seat such as in an automobile bus.

Figure 1 is a cross section on the line 1—1 of Fig. 2;

Fig. 2 is a front view of a seat supported by the flexible joint of my invention, the front depending flange of the seat being removed;

Fig. 3 shows in detail one construction of a flexible joint according to my invention, in position between supporting arms;

Fig. 4 is an end view of the construction shown in Fig. 3;

Fig. 5 is a cross section of the construction shown in Fig. 3, taken on the line 5—5; and Fig. 6 is a modification of the construction shown in Fig. 3.

The flexible joints of my invention are so designed that their manufacture will be even cheaper than the manufacture of the devices shown in my co-pending application above referred to, and the means of supporting the seat shown in this application has advantages as brought out below.

Referring first to the structure of the plates with projections assembled thereon and the flexible joint comprising such plates disclosed in Fig. 3, there is shown a body of resilient material 1 provided with recesses 2, into which projection members or shells 3, 3' are fitted through holes 4 in plates 5. Whereas in my co-pending application I disclose the use of a plate with a plurality of drawn projections thereon, I have found it less expensive to combine a plurality of projection members as the shells, 3, 3' and 32 with a plate of suitable substance such as a metal or other material, which may be rolled or cast or otherwise formed, and is preferably perforated as here shown. Such a combination of parts as used to replace a drawn article of manufacture is embraced as an important feature of this invention.

In the structure disclosed in the drawings, the plates 5 may be of sheet metal or they may be cast or they may be of any other desirable structure which best lends itself to the particular use for which the flexible joint is designed. The holes 4 may be formed by punching or in any other desirable manner. The shells are of pressed material preferably, and although they may be of any desirable shape a cup shape, having a cylindrical cross section, with collars 6 is very satisfactory. The shells are held in place by outer plates 7, which may be cupped as at 8 if desired, or the plates may be preferably flat. The inner and outer plates may be secured in any desirable manner, such as by bolts 9 or by projections on either the inner or outer plate which fit into holes in the other plate. Such a manner of securing the plates from moving on one another is shown in the projections 10 and holes 11. The plates are held in place over the resilient member by a collar 12 flared at the ends. This collar prevents wear on the resilient member on the insertion of the bolt 13, which holds the supporting arms 14 and 15 in place. Washers 16 and 17 are inserted to properly space the plates where pressure is applied.

In order that there may be room for the rubber or other resilient material to flow when subjected to strain, I have provided lips 18 and 19 on the outer plates to form a space into which the material may flow. Other flow space is provided under the projections 10 and also in the spaces 20 and 21, which occur between the bottom of the shells 3 and 3' and the opposite inner plates in the arrangement shown in Fig. 3. In this arrangement, the recesses 2 extend clear through the resilient member. Other modifications are possible in which the recesses do not extend clear through the member, in which case the recesses may be only sufficiently large to accommodate the shell, or they may be slightly larger, allowing room for flow of the resilient material. Further space for flow may be provided by forming slits in the shell members or in the plates.

Inasmuch as it is practically impossible to mould the rubber members uniformly of the same thickness, I have provided a plate 22, which may be of metal or any other suitable material, which serves as a filling material to make the joint tight. These plates or shims 22 may be of varying thickness, depending upon the requirements of individual joints. The shims are cut away at the necessary places to allow for the insertion of the cups and bolts as shown at 23 and 24. If desired, the shim may also be cut away to provide a hole to coincide with the space 21 if extra space is desired at this point for flow of the resilient material.

The shape or the number of the shells which may be used in my flexible joint may be varied to suit conditions. I have shown in the drawing a flexible joint in which there are six shells, three of which are supported from one side of the flexible joint, and the other three of which are supported from the other side of the flexible joint. By this construction, certain peculiar advantages are obtainable, in that the shells of the flexible joint, shown in Figs. 3 and 6, extend more than half way through the flexible joint and these shells are staggered, half being inserted from one side of the flexible joint and the other half being inserted from the other side of the flexible joint, as indicated by the numerals 3 and 3' in Figs. 3, 4 and 5. With this arrangement, if, due to age, or an unusually large force or for any other reason, pressure applied to the supporting arms should shear or in any other way destroy the resilient member, it is possible for the supporting arms to move through only a small angle and no further, and then the movement will be stopped by shells from the opposite sides of the flexible joint abutting one another. This may be clearly seen from the arrangement of the shells shown in Fig. 5, in which the shells 3 are supported from one side of the flexible joint, and the shells 3' are supported from the opposite side of the flexible joint. In case of the destruction of the resilient material, the supporting arms will turn about the axis of the flexible joint until the shells 3, moving in one direction, contact with the shells 3' moving in the opposite direction. It is impossible for the supporting arms to move through an angle greater than a few degrees because these shells 3 and 3' act as stops. Except for the fact that the shells are staggered, some being forced through from one side of the flexible joint and others being forced from the other side of the flexible joint, and also for the fact that the shells are greater in height than one-half the thickness of the flexible joint, in case of the destruction of the resilient material the supporting arms would be free to swing about the axis. The disadvantages of such a construction are obvious when used in the support of a seat, as in Fig. 1, for example, where the seat would swing over backwards until the back touched the floor. With the arrangement of the shells as shown in the drawings, such an accident is impossible. This safety arrangement is an important feature of my present invention.

The flexible joint shown in Fig. 6 is a modification of that shown in Fig. 3, which latter is the more desirable, inasmuch as the construction there disclosed is less expensive than that of the structure shown in Fig. 6.

In Fig. 6 I have shown a resilient member 30, which may be of rubber or leather or any other suitable material and in which there are recesses 31, which unlike those in Fig. 3 do not extend clear through the resilient member, but are adapted to fit the shape of the shells 32. These shells 32 show a desirable modification of the shells shown in Fig. 3, and differ from those formerly described in that the corners are rounded and the walls of the shells are somewhat tapered. The shells are forced through holes 33 in the inner plates 34. The rims of the holes 33 may be flared somewhat to form lips 35, and the shells may be spot-welded or riveted or otherwise affixed to the plates 34. Outer plates 36 are provided with embossings 37 which fit over the collars 38 of the shells and hold the shells firmly in place. These outer plates may be held in position with respect to the inner plates by rivets 39 or bolts or by projections on one plate interlocking with holes on the other plate as represented by the projections 40 and holes 41. Instead of a projection on one plate and a hole in the other, there may be interlocking projections on both the plates. Any other suitable means may be utilized for holding the plates or other parts of the joint in position. The outer plates may be bolted to the supporting arms 15 and 42 as shown at 43 or holes and projections may be utilized as shown at 44.

A collar 45 is provided to prevent abrasion of the resilient member on insertion of the bolt 46, which holds the supporting arms and joint together. The collar 45 may also serve as a spacing member. Washers 47 are provided to space the outer plate and supporting arms. Cups for flow of the material are provided by the lips 48 and 49, which correspond to the lips 18 and 19 of Fig. 3.

By the constructions above set forth, a very compact, flexible joint of inexpensive construction is shown, and there is practically no machining necessary on any of the metal parts, most of the operations being confined to stamping, drawing, and punching, and if desired a few electrical welds, rivets or bolts, although it is possible to construct a serviceable flexible joint even without any electrical welding or riveting as shown above in connection with Fig. 3. The assembly is simple, and the cost of production is for these reasons exceedingly low.

The flexible joints described above are adapted to be used in many places, and their construction may be varied somewhat to fit the use to which they are to be put. The resilient material, for example, may be made of leather or of rubber, or by varying the density of the rubber or other material the resilience of the joint may be controlled. One very desirable application of my flexible joints is in the mounting of seats as in automobile buses. A spring mounting in a chair is undesirable in that after compressing a spring, there is always a reverse reaction when the spring is released, and the resulting oscillation is annoying. There is no such oscillation on compressing a resilient material, such as rubber. The rubber, after pressure is released, gradually comes back to its former position, and this action is very desirable in a seat support. The whole top structure of the chair supported in the manner herein disclosed rides in rubber supports. The structure is simple and is economical of room, and therefore is particularly adapted for use in automobile buses.

In Figs. 1 and 2, I have shown such a seat in which 50 represents the back of the seat and 51 the seat proper, which may contain springs (not shown) as in an ordinary seat, and which together are supported in the seat framework 52. In the drawing I have shown the seat supported from a floor standard 42, to which the flexible joint 53 is fixed. The floor standard 42 is fastened to one side of the flexible joint and to the other side is fastened the support 15 which carries the weight of the chair, and is fastened to the framework of the chair by the plate and rivets shown at 54.

In Fig. 6 I have shown the flexible joint between the arms 15 and 42. Instead of supporting the flexible joint on a floor standard 42 it may be fastened to the side of the bus, or in case the seat is located over a wheel housing the flexible joint, or shock absorber, 53 may be supported by the side of the housing. Fig. 3 indicates such a construction in which 14 represents the side of the bus or the housing, as the case may be. The cups 8 may be omitted.

Although I have shown the seat supported by three standards, each embracing a flexible joint, it is understood that the number of standards may be varied to suit the conditions.

By the arrangement shown, a comfortable seat is afforded, not only because the seat is resiliently supported in the rubber flexible joint, but also because of the fact that the weight of the seat is supported entirely at one end of the supporting member 15, which is supported by the flexible joint 53 which is positioned in front of the center portion of the seat. By this cantilever arrangement of support, the passenger is afforded a most comfortable and what may be termed an "easy-riding" seat. The vibrations are largely taken up by the resilient material within the flexible joint and in addition to this the greater part of the sudden shocks and strains is absorbed by the resilience of the supporting member 15.

By the arrangement shown, a force applied, for example, to the front part of the seat, whether it be a sudden force applied from above or a force resulting from a sudden rising of the floor structure below due to an irregularity in the road, is taken up by the supporting means in a way adding much more to the comfort of the passenger than is provided by a supporting means in which there is no resilient member, or by a supporting means in which there is no provision for such a cantilever action as is provided in the means here disclosed. When such a force as described above is suddenly applied, for example, from above onto the fore part of the seat, the movement of the seat in response to such a force is very different from what the movement would be if the seat were supported directly by standards without the supporting members 15 which provide the cantilever action described above. In most methods of support, if a force is suddenly applied from above, it is impossible for the seat to respond to the force by lowering itself both front and back. The force may result in a rocking movement of the seat, but there is no such motion given to the seat as is provided in the structure shown, due to the leverage provided by supporting the seat entirely from the rear on the supporting members 15, which in turn are supported by the flexible joints 53.

By the cheapness of construction of the flexible joint disclosed above using retarding plates in which shells are forced through holes in plate members, whether all from one side of a flexible joint or whether staggered as illustrated in Figs. 3 and 6 in which half of the shells are forced through plates on one side of the flexible joint and half through plates on the other side, a cheap method of construction of a serviceable flexible joint is disclosed, which construction is so inexpensive that it allows the use of flexible joints in many places where now their cost makes their use prohibitive. The use of the plates herein disclosed instead of plates with drawn projections reduces the cost of plates of this design to a point where they may find wide use. Aside from the inexpensive construction of the flexible joints herein disclosed, the safety factor resulting from the staggered arrangement of the shells explained above adds another desirable feature to these flexible joints. The combination of inexpensive construction and the safety factor indicated above makes the use of such joints in a chair support very desirable. The features herein disclosed are a part of my invention insofar as they are covered in the following claims.

I claim:
1. A chair support comprising a base, an arm secured to the chair, and a resilient member into which projections protrude from the base and arm, said projections having a height of over one-half the depth of the member.

2. A seat support comprising an arm secured to the seat, a support secured to the floor, a resilient member, and spaced connections from the arm and the support to opposite sides of said member, said connections producing a shearing tendency in the member when the seat is loaded.

3. A seat support comprising an arm secured to the seat, a support secured to the floor, a resilient member, and substantially horizontal projections inserted in said member at spaced points, certain of said projections being secured to said support and the remaining projections being secured to said arm.

4. A seat support comprising an arm secured to the seat, a support secured to the floor, a resilient member, and substantially horizontal projections inserted in opposite vertical sides of said member at spaced points, the projections at one side being secured to said support, and the projections in the other side being secured to said arm.

In testimony whereof I affix my signature.

GERHARD FLINTERMANN.